Sept. 20, 1960     D. FRAZIER     2,953,681
SYSTEM FOR MEASURING MASS FLOW RATE BY RADIATION
Filed Sept. 21, 1954     3 Sheets-Sheet 1

INVENTOR
DAVID FRAZIER
HIS ATTORNEYS

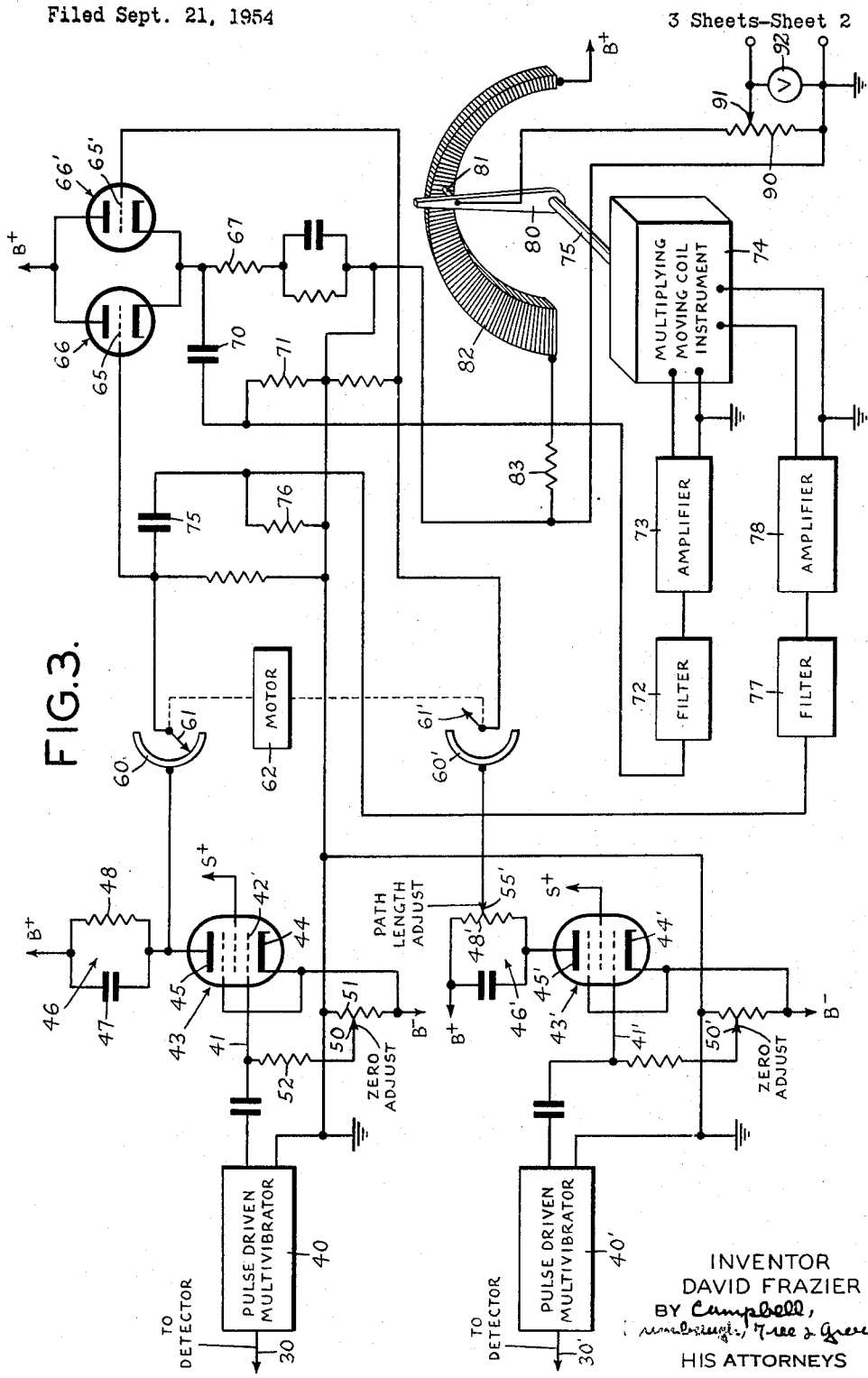

Sept. 20, 1960          D. FRAZIER          2,953,681
SYSTEM FOR MEASURING MASS FLOW RATE BY RADIATION
Filed Sept. 21, 1954          3 Sheets-Sheet 3
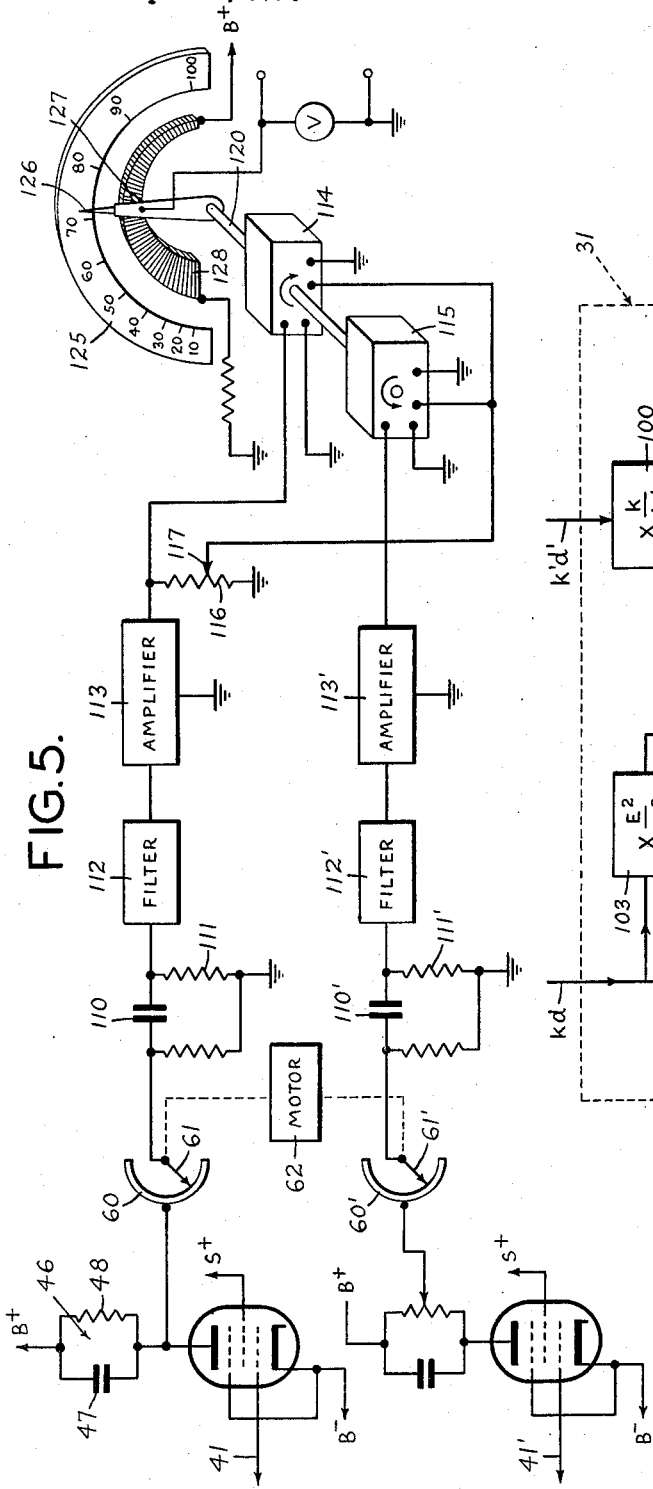
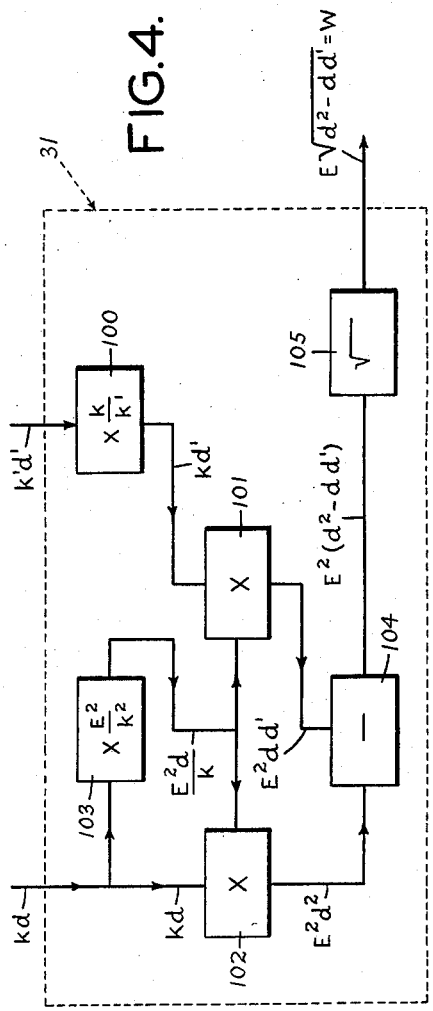
INVENTOR
DAVID FRAZIER
HIS ATTORNEYS

United States Patent Office 2,953,681
Patented Sept. 20, 1960

2,953,681

SYSTEM FOR MEASURING MASS FLOW RATE BY RADIATION

David Frazier, Cleveland Heights, Ohio, assignor to The Standard Oil Company, Cleveland, Ohio, a corporation of Ohio Filed Sept. 21, 1954, Ser. No. 457,361

13 Claims. (Cl. 250—43.5)

This invention relates generally to a system for measuring by radiation the mass flow rate of a particulate material entrained in a carrier gas. More particularly, this invention relates to a system of the above noted character which, in measuring such mass flow rate, adequately copes with the factors of variable fluid velocity and variance in the ratio between the densities of the particulate material and the carrier gas.

In industrial operations it is not uncommon for some state of the operations to involve a situation wherein a finely sub-divided or "particulate" material is entrained a carrier gas to be transported through a conduit system by the carrier gas. In some applications the entrained particulate material may be unwanted as, say, where the material is in the form of water droplets in a steam line or soot particles in a chimney flue. In other applications the particulate material may be deliberately entrained in the carrier gas to serve a useful purpose. For example in petroleum refining it is common to transport finely divided catalytic material from a place of storage to the place of chemical reaction by the expedient of entraining the catalyst in a moving carrier gas. Whether the entrained material is wanted or unwanted, however, in many instances it is highly advantageous to be able to measure the mass flow rate of the particulate material through a given portion of the conduit system in order to calculate the total discharge of material from one or more outlets of the system.

The determination of the mentioned mass flow rate involves a number of problems which have not been satisfactorily dealt with by the prior art. Conventionally the mass flow rate of fluid moving with constant flow through a conduit is ascertained by partially obstructing the flow of the fluid to create a pressure differential between two different regions of the conduit. Pressure measuring devices such as liquid level manometers or resilient diaphragm pressure gages open into these regions in such manner that the sensitive elements of the devices are directly in contact with the fluid to be acted upon by the pressure thereof. The pressure differential indicated by the devices as existing between the two regions is converted in accordance with Bernoulli's theorem into a figure representing the velocity of flow of the fluid at a given point in the conduit. Hence if the density of the fluid at this given point is known, the mass flow rate of the fluid can be determined by multiplying the obtained velocity value by the known density value and by a constant value coefficient which allows for factors such as the cross-sectional area of the conduit at the given point.

It often happens however, that the above described conventional method of measuring mass flow rate is not available. If the fluid is characterized by high temperature and pressure, the use of conventional pressure measuring devices may be precluded because of the danger of breaching the wall of the conduit to permit contact of the fluid with the devices, and because of the further danger of injury to the devices from contact with the fluid. Moreover, if the fluid is in the nature of a carrier gas with particular material entrained therein, the particulate material, if corrosive or gritty, may foul conventional pressure measuring devices by contact therewith. Conversely, if the particulate material is a catalyst or like substance requiring purity of composition, the contact of the material with portions of a pressure gage, such as the indicating liquid of a manometer, may introduce impurities into the material which renders it inoperative for its intended purpose. Accordingly, in many instances it is necessary that the fluid carrying conduit be entirely closed, so that there is no contact communication of fluid with the means employed to measure mass flow rate.

Moreover, as an independent consideration, it will be appreciated that the above described conventional mode of measuring the mass flow rate of a fluid is not generally applicable to the measurement of an entrained particulate material, for the reason that there is no necessary connection between the mass flow rate of the carrier gas from which the pressure readings are derived and the mass flow rate of the entrained material. For example, in two cases where the density and velocity of the carrier gas at a given point in a conduit are kept at the same value, but where the mass of particulate material entrained in a unit volume of carrier gas at this given point is much less in the first case than in the second, the ordinary pressure measuring devices would register the same flow rate in both cases, although it is evident that the mass flow rate of particulate material is much less in the first case than in the second. As another example, assuming another two cases of mass rate flow wherein, at a given point in the conduit, the density of particulate material and the velocity of the carrier gas in the second case are respectively half and double the values existing for the first case, the conventional pressure differential method of measuring mass rate flow would give a result twice as large in the second case as in the first, whereas it is evident that the mass rate flow of particulate material in both cases is the same.

As an outgrowth of the problems mentioned above, it has previously been proposed to determine the mass flow rate of an entrained particulate material by passing a beam of penetrating radiation through a given point in a conduit which carries the material in entrained form in a carrier gas. The radiation beam as it emerges from the conduit excites a radiation detector to give a reading indicative of the amount of material then present in the limited region traversed by the radiation beam. In order to determine the mass flow rate of the particulate material however, the previous proposal necessitates that the flow velocity of the carrier gas be kept at a constant known value, so that the mass flow rate of particulate material is a function only of the amount of material detected at the given point in the conduit. The previous proposal because of its neglect of the velocity of flow of the particulate material as a measurement factor, is thus of no application in those numerous instances where it is desirable to vary flow velocity in order to control the mass flow rate of the material. For the same reason the above described proposal is of no application in those instances where a, not necessarily desired, but unavoidable variance in flow velocity occurs from time to time.

Other proposals have been made for utilizing a beam of penetrating radiation to determine the flow characteristics of a fluid. However, these previous proposals, first, are limited in application to the measurement of flow of batches of material rather than continuous measurement of mass flow rate, and, second, are not adapted to the measurement of the mass flow rate of particulate material entrained in a carrier gas.

It is an object of the invention accordingly to provide method and apparatus for obtaining continuous indications of the mass flow rate of particulate material entrained in a carrier gas, irrespective of any change in the flow velocity thereof or the density thereof relative to the density of the carrier gas.

Another object of the invention is to provide method and apparatus of the above noted character for measuring the mass flow rate of an entrained particulate material which is carried in a completely closed conduit.

Yet another object of the invention is to provide method and apparatus of the above noted character for obtaining a unitary indication determinative of the mentioned mass flow rate.

A further object of the invention is to provide method and apparatus of the above noted character for obtaining an indication which is directly proportional to the value of the mentioned mass flow rate.

These and other objects of the invention are attained, in accordance with the invention, by providing a conduit means which defines a fluid flow path of the constant flow type for the fluid constituted of the carrier gas and the particulate material entrained therein. A partial barrier means is interposed in the flow path to produce, between two flow path regions, a differential in the density of the flowing carrier gas. The creation of this carrier gas differential between the two regions results in the creation of a proportional density differential for the particulate material entrained in the carrier gas. From the respective density values of the material in the two regions the mass flow rate of the material may be determined.

To measure these last named density values, a radiation source means is disposed to irradiate each of the two regions with penetrating radiation which is absorbed in passage through the fluid as a function of the density in the region of the particulate material. In association with this radiation source means there is also provided a radiation responsive means which is disposed to receive the radiation from the source means by way of separate paths respectively traversing the mentioned two regions. The radiation responsive means when excited by the radiation received thereby is adapted to produce an indication determinative of the mass flow rate of the particulate material.

As an additional feature, according to the invention, the radiation responsive means comprises a pair of separate radiation detectors having outputs which are conjointly supplied to a computer means. The computer means by various operations which simulate mathematical steps combines the detector outputs to, first, produce a unitary indication determinative of the mentioned mass flow rate, and to then produce an indication which is directly proportional in value to the mentioned mass flow rate.

The invention may be better understood from the following detailed description of representative embodiments thereof taken in conjunction with the accompanying drawings wherein:

Figure 3 is a schematic diagram of components of the embodiment of the computer corresponding to the flow diagram of Figure 2;

Figure 4 is a flow diagram of the operations simulating mathematical steps of another embodiment of the computer of Figure 1, and Figure 5 is a schematic diagram of components of the computer embodiment corresponding to the flow diagram of Figure 4.

Figure 1:
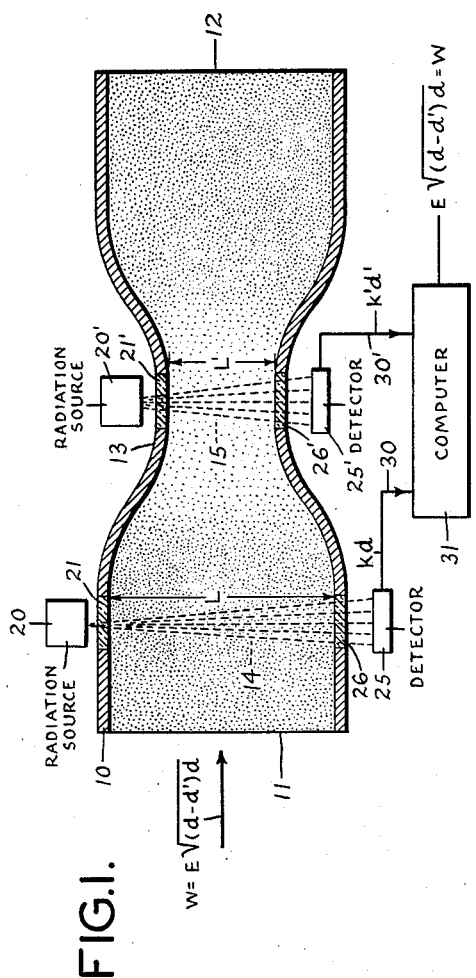
Figure 1 is a view taken partly in cross-section of a flowmeter system together with a computer operated by the primary indication of the flowmeter system.

Referring now to Figure 1, the numeral 10 designates a conduit means in the form of a conduit pipe having an entrance 11 and an exit 12. The conduit 10 defines a constant flow path for fluid moving between its entrance and exit in the sense that, for steady state flow, the amount of fluid entering and leaving the conduit in a given time period is the same. In the present instance the conduit 10 is adapted to carry a fluid constituted of finely divided particulate material (represented by the stippled dots within the conduit) entrained in a carrier gas (represented by the white interspace between the stippled dots).

The linear flow of fluid through conduit 10 is partially obstructed by a partial barrier means 13 which, as shown in Figure 1, takes the form of a faired constriction acting as a venturi, but which, within the principle of the invention, might be a similar barrier means effecting conversion between the pressure head energy and kinetic energy of the fluid such as, say, a Pitot tube, an orifice or a nozzle.

Considering the effect of the faired constriction 13 upon fluid flow, because of the constant flow nature of the fluid movement, the mass of fluid passing through a cross-sectional area of the pipe in a given time is the same for all cross-sectional areas. Also, by the law of the conservation of energy, the total energy characterizing any unit mass of fluid remains constant as the unit mass progresses down the pipe. The total energy of a unit mass of fluid however, exists in the interchangeable forms of pressure head energy and kinetic energy. Thus as the velocity of a unit mass of fluid increases, the pressure exerted by the unit fluid mass must decrease, and conversely.

The various factors mentioned above of constant flow, conservation of energy, and the interchangeability of pressure head and kinetic energy are integrated by Bernoulli's theorem which, in a general sense, indicates that if the linear flow of a fluid is disturbed to cause a change in the velocity of flow of the fluid between the disturbed region and an undisturbed region, the change in the velocity will be accompanied by a pressure differential between the two regions by means of which the velocity of the fluid can be ascertained. If the undisturbed flow velocity of the fluid is once known, and the density of the fluid in the undisturbed region is also known, it is evident that the mass flow rate of the fluid through the conduit can be determined from the velocity and pressure values plus other constant factors relating to the dimensional characteristics of the flow path through which the fluid moves. More specifically, in the case of the venturi constriction 13 of Figure 1, it can be shown that the mass rate of flow W of the carrier gas is given by the expression:

$$W = B\sqrt{(P-P')D} \qquad (1)$$

where P is the carrier gas pressure at an undisturbed flow region 14 upstream of the venturi 13, P' is the carrier gas pressure in the venturi flow region 15, D is the carrier gas density in region 14 and B is a constant having a value determined by the cross-sectional area of the venturi and by other factors as taught in The Chemical Engineers Handbook, Second Edition, pages 834-842. Expression 1 given above assumes that the flow of the fluid is "substantially constant flow" in the sense that, although the fluid velocity may change, the rate of change is sufficiently slow that the error in measurement caused by the velocity change lies within the acceptable tolerance for error of the measurement.

It is evident that in the case of constant fluid flow, as exemplified by the situation existing within the interior of conduit 10, the density of the carrier gas within a given conduit region will vary directly as the pressure exerted by the gas within that region. Thus the expressions may be derived $$P = aD \qquad (2)$$

$$P^1 = aD' \qquad (3)$$

where D' represents the density of the carrier gas in region 15 and $a$ represents a constant having a value dependent upon the ratio $L/L'$, L and L' being the diameters of the conduit in regions 14 and 15 respectively. Substituting the values for P and P' in Expressions 2 and 3 into Expression 1 there may be derived the expression $$W = B\sqrt{(aD - aD')D} \qquad (4)$$

Since the factor $a$ is a constant, it is evident that $\sqrt{a}$ will also be a constant. Accordingly, Expression 4 can be simplified by removing $a$ from underneath the square root sign of the expression such that $$\omega = E\sqrt{(D - D')D} \qquad (5)$$

where the constant E equals $B\sqrt{a}$.

While Expression 5 relates the mass flow rate W of the carrier gas to the density values of the gas existing in regions 14 and 15, the relationship established by the expression is in itself of no utility in determining the mass flow rate $w$ of the particulate material entrained in the carrier gas, since, as stated above, there is no necessary connection between W and $w$. It is evident, however, that the pressure differential between regions 14 and 15, which causes a change in the density of the carrier gas from a value D to a D', will also cause a change between regions 14 and 15 in the amount of particulate material entrained in a unit volume of the gas. In other words the creation of a pressure differential between regions 14 and 15 results in the creation of different densities $d$ and $d'$ for the entrained material in these regions.

Assume that the value of the ratio between carrier gas density and entrained material density in a given region is represented by the term $y$. It will be evident that $y$ will have the same value for both regions 14 and 15 where there is "substantially steady state density flow" in the sense that, although the density ratio may change, the rate of change is sufficiently slow so that the error in measurement caused by the change lies within the acceptable tolerance for error in measurement. Thus, except in the unusual case of density flow which is not substantially steady state, the expression $$\frac{D}{d}=\frac{D'}{d'}=y \qquad (6)$$

is proper even though the value of $y$ may change. Also for the same type of flow the expression $$\frac{W}{w}=y \qquad (7)$$

is proper, since the mass flow rates of the carrier gas and the entrained material will have the same ratio relation as the densities of these fluid constituents.

From the relation established by Expression 7 and from the further relations established by Expression 6 it is possible to replace the factors W, D and D' relating to carrier gas in Expression 5 by the factors $w$, $d$ and $d'$ relating to the particulate material as follows:

$$wy=E\sqrt{(yd-yd')yd} \qquad (8)$$

or simplifying $$w=E\sqrt{(d-d')d} \qquad (9)$$

The last derived expression by relating the mass flow rate $w$ of the particulate material to the densities $d$ and $d'$ of the material in regions 14 and 15 is significant inasmuch as it shows that $w$ can ordinarily be determined without reference to $y$, the value of the ratio between the densities of the carrier gas and of the entrained material. Thus the use of $d$ and $d'$ to determine $w$ permits the mentioned density ratio to change freely during substantially steady state density flow without introducing an error factor into the determination.

The last derived expression is also significant since it shows that by relating the quantity $w$ to the quantities $d$ and $d'$, the mass flow rate $w$ of the particulate material can be determined without reference to the flow velocity through the conduit of the fluid constituted of the entrained material and of the carrier gas. Thus the flow velocity may change freely, consonant with substantially constant fluid flow, without introducing an error factor into the determination of the value of $w$.

Considering now the mode by which an actual indication determinative of the value of $w$ is obtained, in association with the conduit 10 there is provided a radiation source means disposed with respect to the conduit to irradiate with penetration radiation each of the regions 14 and 15. Also in association with the conduit 10 there is provided a radiation responsive means disposed to receive the radiation form the source means by way of separate paths which respectively traverse the regions 14 and 15.

Preferably the radiation source means takes the form of a pair of radiation sources 20 and 20' each disposed outside the conduit 10 and respectively disposed opposite the regions 14 and 15. Within the contemplation of the invention however, the sources 20 and 20' may also be disposed inside the conduit within the regions 14 and 15 respectively. When outside the conduit, as shown in Figure 1, the sources 20 and 20' should be located close to the conduit wall to minimize the absorption suffered by the source emanated radiation before it reaches the conduit interior. To further minimize this unwanted absorption, the conduit 10 may be provided, in front of the sources 20 and 20', with radiation-pervious windows 21 and 21' which are composed of quartz, polytetrafluoroethylene or a like material having a low radiation absorption coefficient.

The sources 20 and 20' are sources of radiation of a nature to penetrate particulate material which, when entrained in a carrier gas, is impervious to ordinary electro-magnetic radiation such as visible light. Thus the sources 20 and 20' may, for example, be sources of high energy electro-magnetic irradiation such as X-rays or gamma rays or may be sources of penetrating particle radiation such as beta rays or neutron radiation. Preferably however, sources 20 and 20' are sources which by radioactive disintegration produce radiation in the form of gamma rays.

When the sources 20 and 20' are radio-active sources, it is evident that the radio-active material utilized for the sources should have a reasonably long half life. Also since the degree to which gamma irradiation is absorbed bears an inverse relation to the energy of the radiation, it is desirable to use a source of gamma radiation which, although sufficiently energetic that its carrier gas absorption is negligible compared to its particulate material absorption, has an energy level low enough to give a noticeable difference between the amounts of radiation absorbed by the entrained particulate material at various density values thereof. Also in some instances it is desirable to use a source of mono-energetic gamma radiation in order to assure that the absorption of radiation will be substantially exponential along a path through the particulate material.

From the above and other considerations, particular radio-active sources well known to the art may be selected as suitable for the particular existing circumstances (as say radiation path lengths and the absorption coefficients of the carrier gas and entrained material) under which the radio-active source is to be used. Among other radio-active sources which will suggest themselves are the natural source of radium which has a long half life, the artificial source of radio-active selenium to give low energy gamma radiation and the artificial source of radio-active cobalt which emanates substantially mono-energetic gamma radiation.

The radiation beams emanated from sources 20 and 20' into regions 14 and 15, continue in these regions along respective paths through the carrier gas and the entrained particulate material. As stated, the radiation utilized is of a nature to have negligible absorption by carrier gas but appreciable absorption by the particulate material. As is well known, the amount of absorption taking place during passage of the radiation through the material is, to a first order approximation, directly proportional to the density of the entrained material in the conduit fluid. Hence the degree to which radiation is absorbed in the beams traversing regions 14 and 15, is in the nature of a measure of the respective density values of the entrained material in these regions.

To measure the degree of radiation absorption, the aforementioned radiation responsive means preferably takes the form of a pair of radiation detectors 25, 25' which may be Geiger-Müller counters, proportional counters, scintillation counters, ionization chamber instruments, or the like, but which in the embodiment of Figure 1 are considered to be Geiger-Müller counters. As shown in Figure 1, the detectors 25, 25' are disposed outside conduit 10 and respectively opposite the sources 20, 20' such that each detector receives radiation from its oppositely disposed source by way of a radiation path which follows a diameter of the conduit. It is within the contemplation of the invention, however, for the detectors 25, 25' to be disposed within the conduit, or to be disposed such that they receive radiation from their corresponding sources by way of paths which, although traversing the regions 14 and 15, respectively, do not follow the conduit diameter. For example, the path between source 20 and detector 25 may follow a chord line of the conduit through region 14, such that this path and the conduit diameter path between source 20' and detector 25' are of equal length. As another example, the radiation path between source 20' and detector 25' may follow a slant line across the conduit such that this last-named path equals in length the path between source 20 and detector 25.

Where detectors 25 and 25' are located outside conduit 10 as shown in Fig. 1, it is desirable that the detectors be located close to the conduit wall to minimize loss of radiation by absorption as the beams travel from the interior of the conduit to their respective detectors. To further minimize this absorption loss, the conduit 10 may be provided in front of the detectors with the radiation-pervious windows 26 and 26'. These windows, like windows 21, 21' may be composed of quartz, polytetrafluoroethylene or similar radiation-pervious material.

Each of the detectors 25, 25' is adapted to produce an electric signal output proportional to the amount of radiation received by the detector. Since the entrained material within conduit 10 operates on each radiation beam to absorb a fraction of the radiation thereof in accordance with the density of the material, the outputs of detectors 25 and 25' will be a maximum when no entrained material is present within conduit 10, and will decrease in value from this maximum as the density of material within each beam increases. Hence, the density of material within region 14 is represented by the amount of decrease from maximum of the output of detector 25, while the density of material in region 15 is similarly represented by the amount of decrease from maximum in the output from detector 25'.

These output decreases of the detectors can thus be considered the significant output signals of the detectors. Since a proportional relation exists between the density $d$ of material in region 14 and the output signal of detector 25, the value of the output signal can be expressed (as shown in Fig. 1) as $kd$ where $k$ is a proportionality constant. By similar reasoning the output signal of detector 25' can be expressed in the form $k'd'$, where $k'$ is another proportionality constant. The constant $k'$ will be of different value than the constant $k$ for the reason that the path for radiation through region 15 is shorter than the path for radiation through region 14.

The outputs of detectors 25, 25' provide an indication determinative of the mass flow rate $w$ in the sense that from the information of the outputs the densities $d$ and $d'$ may be calculated, combined to give the expression $\sqrt{(d-d')d}$, and then multiplied by $E$ to give the value for $w$. A two-output indication is not the most convenient indication, however.

To provide a more convenient indication, the detector output signals $kd$ and $k'd'$ are supplied via the leads 30 and 30' as separate inputs to a computer 31. The computer 31, which may be an electronic or electromechanical computer operating on either the binary or analog principle, is adapted to perform operations on these input signals simulating mathematical steps such that the computer provides an output in the form of a direct reading of the value of the mass flow rate $w$.

Regardless of the type of computer used, it is evident that the inputs to the computer of $kd$ and $k'd'$ may be converted into the desired computer output $E\sqrt{(d-d')d}$ by various combinations of computer operations. As exemplary of this fact, Figs. 2 and 3 show, respectively the flow diagram for one computer scheme and an embodiment for carrying out the same, while Figs. 4 and 5 respectively show a flow diagram of another computer scheme and an embodiment for carrying out this latter scheme, both computer schemes having the same inputs and producing the same result.

Figure 2:
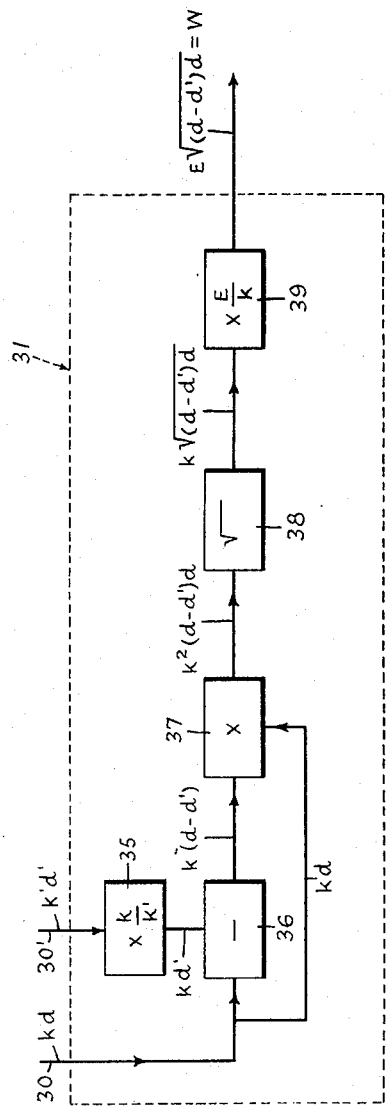
Figure 2 is a flow diagram of the operations simulating mathematical steps which are performed by one embodiment of the computer of Figure 1.

Considering first the computer scheme of Figs. 2 and 3, the detector output signal $k'd'$ on lead 30' (Fig. 2) is in the computer step 35 multiplied by the factor $k/k'$ (or alternatively divided by the factor $k'/k$) to give the signal $kd'$. This signal $kd'$ is combined in a subtractive step 36 with the detector output signal $kd$ to yield the conjoint signal $k(d-d')$. This conjoint signal is then combined in the multiplying step 37 with another input of the detector output signal $kd$ to give the resultant output signal $k^2(d-d')d$.

The resultant output signal $k^2(d-d')d$ by reducing the information of the two detector output signals $kd$ and $k'd'$ into the form of a single signal is useful inasmuch as it provides a unitary indication. This unitary indication is "determinative" of the mass flow rate $w$ in the sense that from the value of the signal the true value of $w$ can be reached by steps requiring merely further calculation rather than additional inputs of measured information. The resultant signal $k^2(d-d')d$ is not the most useful way of indicating $w$, however, since further calculation based on the value of the signal is necessary to reach the true value of $w$. To obviate this need for further calculation, the signal $k^2(d-d')d$ in the computer scheme of Fig. 2 undergoes a square root extracting step 38 to produce a signal $k\sqrt{(d-d')d}$ which is directly proportional in value to the mass flow rate $w$. By a further step 39, the last-named signal is multiplied by the factor $E/k$ (or alternatively divided by the factor $k/E$) to give a computer output signal of the value $E\sqrt{(d-d')d}$. This final computer output signal equals in value the mass flow rate $w$ of the particulate material.

Referring now to Fig. 3 which shows a computer embodiment for carrying out the scheme of Fig. 2, the electrical output from Geiger-Müller detector 25 takes the form of electrical pulses which vary in number per unit time period according to the strength of the radiation received by the detector. These pulses as taught in chapter 10 and particularly section 10.09 of "Nuclear Radiation Physics," by Lapp and Andrews (Prentiss-Hall, 1948) drive a bistable multivibrator 40 (Figure 3) such that the multivibrator output is composed of pulses of uniform size and shape, but matching in number the input Geiger-Müller pulses.

The output pulses from multivibrator 40 are impressed via lead 41 upon the control grid 42 of a pentode 43 having a cathode 44 connected to a negative voltage supply and a plate 45 connected to a positive voltage supply through the integrating network 46 composed of the capacitor 47 and the resistance 48 in parallel. By the well-known action of such integrating networks the voltage drop from the positive supply value appearing across resistor 48 will vary directly as the number of multivibrator output pulses appearing per unit time on control grid 42. Since the pulse frequency varies with the strength of radiation received by detector 25 and, since, for the reasons stated, this radiation strength is maximum for zero density value of the particulate material interposed in the radiation beam, the voltage to ground of plate 45 will be at minimum level for zero density of the particulate material. Using this minimum voltage of plate 45 as a reference level, it will be seen that as the density value of the particulate material in the beam for detector 25 increases from zero, the voltage on plate 45 rises proportionally from its reference level. Hence the voltage rise of plate 45 is equivalent to the signal $kd$ of Fig. 2.

In order to assure that not only the voltage rise of plate 45 from reference level, but in addition, the voltage to ground of plate 45 is at all times proportional to the particulate material density, the mentioned reference level may be set equal to ground by a "zero adjust" consisting of a tap 50 which cooperates with a voltage divider resistor 51 to determine, through the grid-leak resistor 52, the static bias upon control grid 42.

By a multivibrator 40' and an integrating pentode 43' (which are essentially similar to their counter parts described above) the output pulses from Geiger-Müller detector 25' are converted into a voltage to ground on the plate 45' of pentode 43'. In a manner alike to that described above, the voltage rise on plate 45' from a reference level representing zero density of particulate material will be proportional to the density of material in the beam falling on detector 25'. The value of this voltage signal will, however, be $k'd'$ rather than $kd'$ for the reason that the pathway of radiation reaching detector 25' differs from the pathway of radiation reaching detector 25. To correct for the path length discrepancy, the output voltage from pentode 43' is taken, not from the plate 45', but instead from a tap 55', adjustably slidable along the resistor 48'. With a proper adjustment of tap 55' the voltage signal $k'd'$ at plate 45' is converted into the voltage signal $kd'$ at tap 55'.

The voltage signal $kd$ from plate 45 is converted into square wave form by a chopper switch consisting of a fixed contact 60 in the form of a semi-circular sector and a movable contact 61 driven by a motor 62 to close with the sector 60 for the first half of each motor cycle. Similarly, the voltage output signal $kd'$ from tap 55 is converted into square wave form by a chopping switch consisting of a fixed contact 60' and a movable contact 61' which is also driven by motor 62 but which is phased to close with sector 60' during the second half of the motor cycle. Hence, the signals $kd$ and $kd'$ as they respectively appear on contacts 61, 61' are in the form of square wave voltages to ground, the two square wave voltages being oppositely phased with respect to the half cycle in which the square wave drops to ground potential.

Following the described chopping action, the square wave signals $kd$ and $kd'$ are respectively impressed upon the control grids 65 and 65' of a pair of triodes 66, 66' having a common cathode load resistance 67. In the first half cycle of motor 62, the voltage across resistor 67 is proportional to the value $kd$ while in the second half cycle the voltage is proportional to $kd'$. It follows that, if the D.C. component is filtered out of the full cycle voltage across resistor 67, the full cycle voltage will be reduced to the form of an alternating square wave which is balanced with respect to ground and which has an amplitude to ground proportional to the value $k(d-d')$.

The mentioned D.C. component is in fact eliminated from the mentioned full cycle voltage by the use of a D.C. blocking circuit consisting of the capacitor 70 and the resistor 71 connected in series between the common cathode point of triodes 66, 66' and ground. Hence, the signal from capacitor 70 will be the signal $k(d-d')$ as described. This signal is fed by way of a conventional filter 72 (which eliminates harmonics other than the fundamental) and a conventional amplifier 73 to one input of a moving coil instrument 74 adapted to turn a shaft 75 from "zero" through an angular rotation proportional to the mathematical product of two input quantities to the instrument. Instruments of this type are well known to the art, one such instrument being the conventional wattmeter which registers as power the product of an input current and an input voltage.

To provide the other input for instrument 74, the square wave signal $kd$ on movable contact 61 is converted into a balanced alternating signal having an amplitude to ground proportional to $kd$ by the D.C. blocking circuit of capacitor 75 and resistor 76 connected in series between the contact 61 and ground. This alternating signal $kd$ is then supplied from capacitor 75 through a conventional filter 77 (which eliminates harmonics other than the fundamental) and the conventional amplifier 78 to the second input of instrument 74.

In view of the inputs $k(d-d')$ and $kd$, the shaft 75 for the instrument will register in angular deflection the value $k^2(d-d')d$. As stated in connection with Figure 2, the angular deflection of shaft 75 is thus a useful unitary indication of the mass flow rate $w$ although not the most useful form of indication. To obtain an improved indication, the shaft 75 through an arm 80 drives a contact tap 81 over the arcuate extent of a wire wound square root potentiometer 82. The resistance winding of potentiometer 82 is connected at one end to the positive voltage supply and at the other end to ground through a resistor 83. The individual turns of the potentiometer winding are distributed over the potentiometer arc so that, for the normal deflection range of shaft 75, the voltage appearing between tap 81 and ground will be proportional to the square root of the angular deflection of the shaft. Hence, the voltage to ground of tap 81 represents the quantity $k\sqrt{(d-d')d}$. As stated with regard to Figure 2, this last named signal is in the nature of an indication directly proportional to the mass flow rate $w$ of the particulate material.

To convert the last named signal into a signal equal to $w$, a voltage dividing resistor 90 having an adjustable tap 91 is connected between the potentiometer contact tap 81 and ground. By adjusting tap 91 to the proper setting on resistor 90 the voltage between tap 91 and ground can be made equal to the value $E\sqrt{(d-d')d}$. This last named voltage may be indicated directly by the voltmeter 92 or can be used to control the action of a means (not shown) for varying the mass flow rate of the particulate material.

In practice, for proper operation of the computer of Figure 3, the tap 55 should be set in a manner determined by calculation to exactly compensate for the difference in path length between the radiation beams respectively acting upon detectors 25 and 25'. Next, the "zero adjust" tap 50 should be set so that the operating voltage on plate 45 of pentode 43 equals ground voltage when the region 14 of conduit 10 is filled only with carrier gas at its usual density, there being no particulate material present. Thereafter, since the different density of the carrier gas in regions 14 and 15 may, aside from the absorption effect of the particulate material, cause a residual unbalance in the radiation absorption measurements, the zero adjust tap 50' is set so that the voltage at tap 55' is at ground voltage when carrier gas alone flows under the usual density and velocity conditions through the conduit 10. By means of the adjustments just described, the computer of Figure 3 has been adjusted to give zero output reading for zero density of particulate material and a proportional output reading as the density of the material increases from this zero value.

The final adjustment to the computer of Figure 3 is made by calibration, namely, by passing particulate material through conduit 10 at a known mass flow rate and by adjusting the "coefficient adjust" tap 91 until the reading of voltmeter 92 equals the known value of the mass flow rate.

Referring now to Figure 4 which shows another computer scheme, the output signal $k'd'$ from detector 25' is converted, as before, by way of the proportioning step 100 into the signal $kd'$. The thus obtained signal $kd'$ enters as one quantity into a multiplying step 101 while the output signal $kd$ from detector 25 enters as a quantity into another multiplying step 102. The second quantity for each of the multiplying steps 101 and 102 is in the nature of a signal $E^2d/k$, this signal being obtained from the original signal $kd$ by the proportioning step 103. Thus, the resultant signal of multiplying step 101 will be $E^2dd'$ while the resultant signal of multiplying step 102 will be $E^2d^2$.

The signals $E^2d^2$ and $E^2dd'$ are combined in the subtractive step 104 to give the single output signal $E^2(d^2-dd')$, determinative of the mass flow rate $w$. To obtain from the last named signal an indication equal to $w$, the signal $E^2(d^2-dd')$ undergoes a square root extracting step 105 to emerge as the signal $E\sqrt{d^2-dd'}$. It will be recognized that this last named signal is identical in value with the quantity $E\sqrt{(d-d')d}$ and hence is coequal with $w$.

A computer embodiment for carrying out the scheme of Figure 4 is shown by Figure 5. Referring to this latter figure, up to the movable contacts 61, 61', the embodiment of Figure 5 is the same as that of Figure 3. In Figure 5, however, the movable contact 61' is phased with respect to movable contact 61 so that both movable contacts close with their respective contact sectors 60, and 60' during the same half cycle of rotation of the motor 62.

Beyond movable contact 61 the unbalanced square wave signal $kd$ is converted by the D.C. blocking circuit of capacitor 110 and resistor 111 into a square wave signal which is balanced with respect to ground. This balanced signal $kd$ is fed through the conventional harmonic eliminating filter 112 and conventional amplifier 113 to a first input of a multiplying moving coil instrument 114. The unbalanced square wave signal $kd'$ on movable contact 61' is operated on in a similar manner by similar circuit components to be fed as a balanced alternating signal to the first input of another multiplying moving coil instrument 115.

To provide the second input for each of the instruments 114 and 115 the alternating voltage $kd$ at the output of amplifier 113 is developed across a voltage divider resistor 116 having an adjustable tap 117. By proper setting of tap 117 the voltage signal between the tap and ground can be made to represent the second input signal $E^2d/k$ for the two moving coil instruments.

The instruments 114 and 115 with certain distinctions are like the previously described instrument 74 of Figure 3. The distinctions are that both of the instruments 114 and 115 drive the same shaft 120. Moreover instrument 114 drives the shaft clockwise while instrument 115 drives the shaft counter clockwise. The inputs to instrument 114 are $kd$ and $E^2d/k$, such that the instrument tends to deflect the shaft 120 by the amount $E^2d^2$. The inputs to the instrument 115 are $kd'$ and $E^2d/k$ such that instrument 115 tends to deflect shaft 120 by an amount $E^2dd'$. From these facts and from the fact that the two instrument deflections oppose each other, it will be seen that the resultant angular deflection of shaft 120 represents the signal $E^2(d^2-dd')$, and is thus in the nature of a unitary indication of the mass flow rate $w$.

The mentioned unitary indication of $w$ may be converted into an equal value indication of $w$ by the use of the square root scale 125 having graduated indicia such that a shaft deflection indicating pointer 126 reads on the scale the square root of the shaft deflection instead of the angular deflection itself. Moreover, if desired, the square root value, $E\sqrt{d^2-dd'}$, of the shaft deflection signal $E^2(d^2-dd')$ can be taken by means of a contact tap 127 and a square root wire wound potentiometer 128 in a manner similar to that described for Figure 3. As stated this square root value is co-equal with the mass flow rate $w$.

The embodiments described above being exemplary only, it will be understood that the invention comprehends embodiments differing in organization and detail from the described embodiments. For example although the description above refers to the determination of the densities of particulate material in a venturi throat region of a conduit and in a region upstream thereof, the invention is also applicable where such density measurement is made in the venturi throat region and in a region downstream thereof. Accordingly, the present invention is not to be considered as restricted save as consonant with the scope of the following claims.

I claim:

1. A mass rate flowmeter comprising, conduit means defining a fluid flow path, partial barrier means disposed in said flow path to produce between two different regions thereof a differential in the density of a gaseous fluid having a constant flow through said conduit means, said fluid being constituted of a carrier gas and particulate material entrained therein, radiation source means disposed to irradiate each of said two regions with penetrating radiation absorbed in passage through said fluid as a function of the density of said material, and radiation responsive means disposed to receive said radiation from said source means by way of separate paths respectively traversing said two regions, said radiation responsive means being adapted in response to received radiation to produce an indication determinative of the mass rate of flow of said material.

2. A mass rate flowmeter as in claim 1 in which the radiation source means comprises a pair of radiation sources disposed to each irradiate one of said two regions.

3. A mass rate flowmeter as in claim 1 in which said radiation responsive means comprises a pair of radiation detectors.

4. A mass rate flowmeter comprising, conduit means defining a fluid flow path, partial barrier means disposed in said flow path to produce between two different regions thereof a differential in the density of a gaseous fluid having a constant flow through said conduit means, said fluid being constituted of a carrier gas and particulate material entrained therein, first and second radiation sources disposed to respectively irradiate said two regions with penetrating radiation absorbed in passage through said fluid as a function of the density of said material, and first and second radiation detectors disposed to respectively receive radiations from said first and second sources by way of separate paths respectively traversing said two regions, said detectors being adapted in response to received radiation to produce conjointly an indication determinative of the mass rate of flow of said material.

5. A mass rate flowmeter as in claim 4 in which said radiation sources are radioactive sources.

6. A mass rate flow meter comprising, a conduit defining a fluid flow path, a faired constriction disposed in said flow path to produce between the constricted and another region of said flow path a differential in the density of a gaseous fluid having a constant flow through said conduit, said fluid being constituted of a carrier gas and particulate material entrained therein, first and second radiation sources disposed to respectively irradiate said two regions with penetrating radiation absorbed in passage through said fluid as a function of the density of said material, and first and second radiation detectors disposed to respectively receive radiation from said sources by way of separate paths respectively traversing said two regions, said detectors being adapted in response to received radiation to produce conjointly an indication determinative of the mass rate of flow of said material.

7. A mass rate flowmeter comprising, conduit means defining a fluid flow path, partial barrier means disposed in said flow path to produce between two different regions thereof a differential in the density of a gaseous fluid having a constant flow through said conduit means, said fluid being constituted of a carrier gas and particulate material entrained therein, first and second radiation sources disposed to respectively irradiate said regions with penetrating radiation absorbed in passage through said fluid as a function of the density of said material, first and second radiation detectors disposed to respectively receive radiations from said first and second sources by way of separate paths respectively traversing said regions, said detectors being each adapted to produce an output as a function of the radiation received thereby, and computer means responsive to said detector outputs for combining said outputs to produce a unitary indication determinative of the mass rate of flow of said material.

8. A mass rate flowmeter as in claim 7 wherein said computer means is adapted to provide a proportional indication of the mass rate of flow of said material.

9. A mass rate flowmeter comprising, conduit means defining a fluid flow path, partial barrier means disposed in said flow path to produce between two different regions thereof a differential in the density of a gaseous fluid having a constant flow through said conduit means, said fluid being constituted of a carrier gas and particulate material entrained therein, said material in said regions having respective density values of $d$ and $d'$, first and second radiation sources disposed to respectively irradiate said regions with penetrating radiation absorbed in passage through said fluid as a function of the density of said material, first and second radiation detectors disposed to respectively receive radiations from said first and second sources by way of separate paths respectively traversing said regions, said detectors in response to the radiation received thereby being adapted to produce outputs which are functions, respectively, of $d$ and $d'$, first mathematical operation simulator means for combining said detector outputs to produce a resultant output which in value is a function of $(d^2-dd')$, and second mathematical operation simulator means responsive to said resultant output to produce an indication of the square root of the value of said resultant output, said indication being proportional to the mass rate of flow of said material.

10. A mass rate flowmeter as in claim 9 further characterized by means for compensating for a difference between the length of a path traversed by radiation from said first source to said first detector and the length of path traversed by radiation from said second source to said second detector.

11. A mass rate flowmeter as in claim 9 further characterized by means for compensating for the fraction of radiation absorbed by said carrier gas during passage of said radiation through said fluid.

12. A mass rate flowmeter comprising, a conduit defining a fluid flow path, a faired constriction disposed in said flow path to produce between the constricted and another region of said flow path a differential in the density of a gaseous fluid having a constant flow through said conduit, said fluid being constituted by a carrier gas and particulate material entrained therein, said material in said constricted region and said other region having repective density values of $d$ and $d'$ of which the value $d$ is the larger, first and second radiation sources disposed to respectively irradiate said two regions with gamma radiation absorbed in passage through said fluid as a function of the density of said material, first and second radiation detectors disposed to respectively receive radiation from said sources by way of separate paths respectively traversing said two regions, said detectors in response to the radiation received thereby being adapted to produce outputs which are functions, respectively, of $d$ and $d'$, first mathematical operation simulator means for combining said detector outputs to produce a resultant output which in value is a function of $(d^2-dd')$, and second mathematical operation simulator means responsive to said resultant output to produce an indication of the square root of the value of said resultant output, said indication being proportional to the mass rate of the flow of said material.

13. A process for determining the mass rate of flow of particulate material entrained in a compressible carrier gas comprising, flowing the fluid constituted of said material and carrier gas at a substantially constant flow rate through a constant flow path, controlling the pressure gradient of said fluid in the direction of flow thereof to produce in said path two regions of different fluid density, irradiating each such region with penetrating radiation adapted to be partially absorbed by said material as a function of the density thereof in such region, and detecting at each such region a radiation amount remaining unabsorbed by the material in such region, said detected amounts of unabsorbed radiation conjointly providing a measure of said mass rate of flow.

References Cited in the file of this patent

UNITED STATES PATENTS

| | | |
|---|---|---|
| 1,905,251 | Styer | Apr. 25, 1933 |
| 2,381,505 | Lindholm | Aug. 7, 1945 |
| 2,392,951 | Salisbury | Jan. 15 1946 |
| 2,417,877 | Lewis | Mar. 25, 1947 |
| 2,599,975 | Carpenter | June 10, 1952 |
| 2,631,241 | Metcalf | Mar. 10, 1953 |

FOREIGN PATENTS

| | | |
|---|---|---|
| 679,711 | Great Britain | Sept. 24, 1952 |